US008603221B2

(12) United States Patent
Bedard

(10) Patent No.: US 8,603,221 B2
(45) Date of Patent: Dec. 10, 2013

(54) RAPID CYCLE, GAS PERMEABLE, ADSORBENT-CONTAINING PAPER CONTAINING P-ARAMID FIBRIDS AND ZEOLITE

(75) Inventor: Robert L. Bedard, McHenry, IL (US)

(73) Assignee: UOP LLC, Des Plaines, IL (US)

(*) Notice: Subject to any disclaimer, the term of this patent is extended or adjusted under 35 U.S.C. 154(b) by 273 days.

(21) Appl. No.: 13/318,723

(22) PCT Filed: Feb. 23, 2010

(86) PCT No.: PCT/US2010/024964
§ 371 (c)(1),
(2), (4) Date: Nov. 3, 2011

(87) PCT Pub. No.: WO2010/129082
PCT Pub. Date: Nov. 11, 2010

(65) Prior Publication Data
US 2012/0055333 A1     Mar. 8, 2012

Related U.S. Application Data

(60) Provisional application No. 61/176,509, filed on May 8, 2009.

(51) Int. Cl.
*B01D 53/02* (2006.01)

(52) U.S. Cl.
USPC ... 95/96; 96/134; 96/154; 55/524; 55/DIG. 5; 162/164.2

(58) Field of Classification Search
USPC .......... 106/467, 626; 428/221–223, 428/292.1–299.1
See application file for complete search history.

(56) References Cited

U.S. PATENT DOCUMENTS

| 2,999,788 | A | | 9/1961 | Morgan |
| 5,026,456 | A | * | 6/1991 | Hesler et al. ........... 162/146 |
| 5,482,773 | A | | 1/1996 | Bair |
| 5,542,968 | A | | 8/1996 | Belding et al. |
| 5,685,897 | A | | 11/1997 | Belding et al. |
| 5,702,610 | A | * | 12/1997 | Hagen et al. ........... 210/670 |
| 6,120,643 | A | | 9/2000 | Levit |
| 6,159,895 | A | | 12/2000 | Koch et al. |
| 6,293,998 | B1 | | 9/2001 | Dolan et al. |
| 6,406,523 | B1 | | 6/2002 | Connor et al. |
| 6,461,412 | B1 | | 10/2002 | Jale et al. |

(Continued)

FOREIGN PATENT DOCUMENTS

| EP | 0656964 B1 | 6/1998 |
| EP | 1820554 A1 | 8/2007 |
| JP | 7155588 | 6/1995 |

OTHER PUBLICATIONS

PCT International Search Report and Written Opinion for PCT/US2010/024964, mailing date Sep. 28, 2010.

(Continued)

*Primary Examiner* — Duane Smith
*Assistant Examiner* — Joubert X Glover
(74) *Attorney, Agent, or Firm* — Kurt D. Van Tassel

(57) ABSTRACT

A rapid cycle, gas permeable, adsorbent-containing ("RCA") paper suitable for separating at least a portion of a first gas from a second gas in a gas mixture to produce a product stream enriched in the first gas. The RCA paper contains p-aramid fibrids and zeolite.

14 Claims, 1 Drawing Sheet

(56) References Cited

U.S. PATENT DOCUMENTS

| | | |
|---|---|---|
| 6,521,019 B2 | 2/2003 | Jain et al. |
| 6,838,401 B1 | 1/2005 | Murayama et al. |
| 2002/0134239 A1 | 9/2002 | Tang et al. |
| 2003/0207635 A1 | 11/2003 | Minemura et al. |
| 2007/0137818 A1 | 6/2007 | Levit et al. |
| 2009/0025553 A1 | 1/2009 | Keefer et al. |

OTHER PUBLICATIONS

Twaron News, New Twaron Jet-Spun Pulp and Fibrids With Superior Properties, pp. 8-9, dated May 2006.

Chemical Fibers International, New Twaron p-aramid jet-spun pulp and fibrids, vol. 56, No. 3, p. 170, dated Jun. 2006.

Hentschel, Robert A.A.; American National Standards Institute, Standards, Nomex Aramid Papers—Properties and Uses, pp. 189-213, dated 1975.

Zhang, Su-feng et al.; Relation Between Components of Sheet Formation and Aramid Paper Properties, Chung-kuo Tsao Chih/China Pulp and Paper, vol. 27, No. 7, pp. 25-28, dated Jul. 2008 (English abstract).

Mitsui, H.; IEEE Transactions on Electrical Insulation, Improvement of Rotating Machinery Insulation Characteristics by Using Mica Paper Containing Aramid Fibrid, vol. El-18, No. 6, pp. 651-656, dated Dec. 1983.

Bhatia, A.; Aramid Papers With Improved Dimensional Stability, Electrical Electronics Insulation Conference, 1995, and Electrical Manufacturing & Coil Winding Conference Proceedings, dated Sep. 18-21, 1995; pp. 409-410.

* cited by examiner

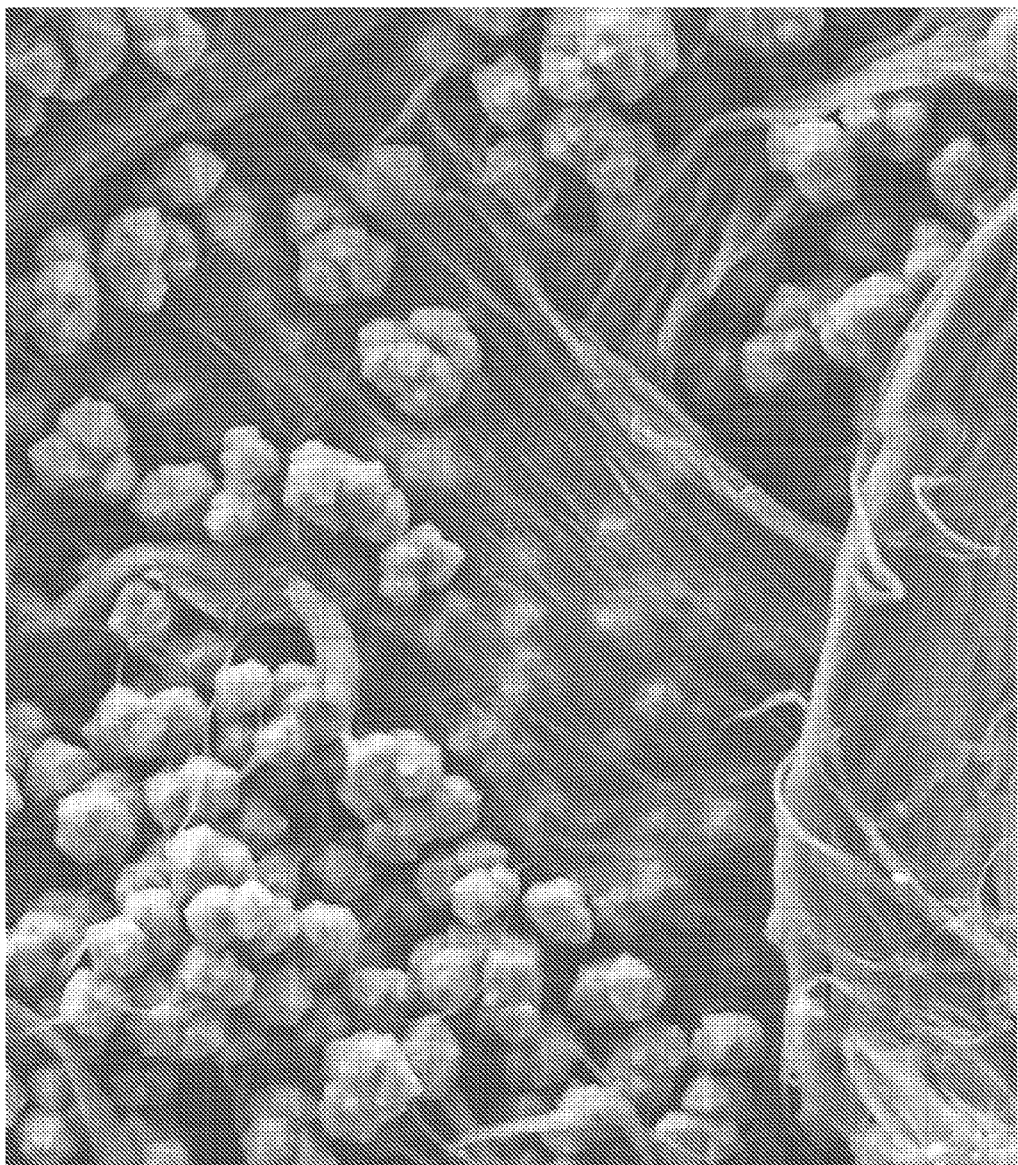

RAPID CYCLE, GAS PERMEABLE, ADSORBENT-CONTAINING PAPER CONTAINING P-ARAMID FIBRIDS AND ZEOLITE

STATEMENT OF PRIORITY

This national stage application, filed under 35 U.S.C. §371, claims benefit of priority under 35 U.S.C. §365 of International Application No. PCT/US2010/024964 filed Feb. 23, 2010, which claims benefit of priority of U.S. Provisional Application No. 61/176,509 filed on May 8, 2009.

FIELD OF THE INVENTION

The invention relates to the use of p-aramid fibrids in the formation of rapid cycle, gas permeable, adsorbent-containing paper for rapid cycle processes.

BACKGROUND OF THE INVENTION

Adsorption systems, such as HVAC systems, liquid and gas purification, solvent and gasoline vapor recovery and deodorization, sorption cooling processes, certain bulk gas separations, etc., sometimes use adsorption media to remove gas phase impurities or more strongly adsorbed major components in a gas mixture. Adsorption processes and sorption cooling processes typically employ some adsorbent media disposed in a metal vessel, which may be self-supporting or contained on a metal screen or surface. The adsorbent is in contact with a fluid or gas stream containing an adsorbable component over the range of conditions necessary for adsorption.

Cyclic adsorption processes are frequently used to separate the components of a gas mixture. Typically, cyclic adsorption processes are conducted in one or more adsorbent vessels that are packed with a particulate adsorbent material that adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out.

In any cyclic adsorption process, the adsorbent bed has a finite capacity to adsorb a given gaseous component and, therefore, the adsorbent requires periodic regeneration to restore its adsorption capacity. The procedure followed for regenerating the adsorbent varies according to the process. In VSA processes, the adsorbent is at least partially regenerated by creating vacuum in the adsorption vessel, thereby causing adsorbed component to be desorbed from the adsorbent, whereas in PSA processes, the adsorbent is regenerated at a lower pressure than the pressure used for the adsorption step. In both VSA and PSA processes, the adsorption step is carried out at a pressure higher than the desorption or regeneration pressure.

Some conventional adsorption media are comprised of a thin sheet or layer such as paper, metal foils, polymer films, etc., and an adsorbent material such as silica gel, activated alumina, activated carbon and molecular sieves such as zeolites. These adsorbent sheets or layers are relatively thin compared to conventional beads, extrudates, or granules. Because thinner media provides a shorter path length from the gas or liquid phase feed to the adsorption site, the mass transfer through these adsorbents is faster than in beads or granules. In addition, the macropore size distribution, particularly in wet laid adsorbent-containing paper, can be roughly an order of magnitude larger than in a typical adsorbent bead. This larger macropore size also increases the mass transfer of the media relative to beads or granules.

Rapid cycle processes require a gas permeable paper that will adsorb and desorb gaseous components in a rapid fashion. Although zeolite-containing papers are known to be used in such processes, such papers often lose their ability to adsorb and desorb the gases because the zeolite particles become detached from the paper, rendering the paper ineffective. This is due to the nature of the rapid cycle process whereby the direction of rapid (high velocity) gas flow is changed repeatedly.

BRIEF SUMMARY OF THE INVENTION

A first aspect is directed to a rapid cycle, gas permeable, adsorbent-containing ("RCA") paper suitable for separating at least a portion of a first gas from a second gas in a gas mixture to produce a product stream enriched in the first gas.

A second aspect is directed to a method of preparing a rapid cycle, gas permeable, adsorbent-containing ("RCA") paper suitable for separating at least a portion of a first gas from a second gas in a gas mixture to produce a product stream enriched in the first gas.

A third aspect is directed to a rapid cycle process for separating at least a portion of a first gas from a second gas in a gas mixture to produce a product stream enriched in the first gas.

BRIEF DESCRIPTION OF THE DRAWINGS

The photographic image depicts a zeolite paper containing p-aramid fibrid.

DETAILED DESCRIPTION OF THE INVENTION

Aspects of the invention are directed to rapid cycle, gas permeable, adsorbent-containing paper for rapid cycle processes ("RCA" paper). The RCA paper is formed from particulate-free para-aramid fibrid, zeolite particles, and aramid pulp. The use of para-aramid fibrid solves the problem experienced with known zeolite containing papers by providing an effective binder for the zeolite particles; thus preventing the zeolite from falling off the paper during the harsh conditions of rapid cycle processes including the rapid (high velocity) flow of gas which repeatedly changes direction. However, the para-aramid fibrids do not affect the gas permeable nature of the paper which is an important paper property related to the success of rapid cycle processing.

As used herein, the term "fibrid" means a wholly synthetic polymeric particle as defined under U.S. Pat. No. 2,999,788, col. 1, lines 35-57 and lines 60-67. In particular, to be designated a "fibrid," a particle must possess (a) an ability to form a waterleaf having a couched wet tenacity of at least 0.002 gram per denier, i.e., 0.34 lb./in./oz./sq. yd. when a plurality of the particles is deposited from a liquid suspension upon a screen, which waterleaf, when dried at a temperature below 50° C., has a dry tenacity at least equal to its couched wet tenacity and (b) an ability, when a plurality of the particles is deposited concomitantly with staple fibers from a liquid suspension upon a screen, to bond a substantial weight of the fibers by physical entwinement of the particles with the fibers to give a composite waterleaf with a couched wet tenacity of at least 0.002 gram per denier, i.e. 0.34 lb./in./oz./sq. yd. In addition, fibrid particles have a Canadian freeness number between 90 and 790 and a high absorptive capacity for water, retaining at least 2.0 grams of water per gram of particle under a compression load of 39 grams per square centimeter. By "wholly synthetic polymeric" is meant that the fibrid is formed of a polymeric material synthesized by man as distinguished from a polymeric product of nature or derivative thereof.

Any normally solid wholly synthetic polymeric material may be employed in the production of fibrids. By "normally solid" is meant that the material is non-fluid under normal room conditions. By " . . . an ability to . . . bond a substantial weight of . . . (staple) fibers . . . " is meant that at least 50% by weight of staple based on total staple and fibrids can be bonded from a concomitantly deposited mixture of staple and fibrids.

The term "particulate-free fibrid" means a fibrid that is either:
(1) synthesized in the absence of a particulate material that is not otherwise a catalyst, monomer, salt or the like customarily used as a reaction constituent for making a fibrid, as generally described, for example, under US 2007/0087178A1; or
(2) formed in the absence of a particulate material that is not otherwise an additive used for enhancing polymeric performance properties such as polymer heat stability, fire retardancy, plasticization, or the like.

The term particulate-free p-aramid fibrid means a particulate-free fibrid in which at least 95% of the amide bonds in the polymer backbone of a wholly synthetic polymeric particle—arising from the polycondensation of a para-oriented aromatic diamine and a para-oriented aromatic dicarboxylic acid salt—are located in the para-oriented or nearly para-oriented opposite positions of the recurring aromatic ring units of the polymer backbone.

The term "zeolite particles" means particles comprising zeolite. Zeolite facilitates the separation of gases such as, for example, without limitation, nitrogen ($N_2$) from air, carbon monoxide (CO) from hydrogen ($H_2$) or carbon dioxide ($CO_2$) from natural gas.

The term "aramid pulp" means pulp prepared from aramid fibers.

The fibrid behaves as a binder for the aramid pulp and zeolite without affecting the desired gas permeability of the final paper product. The fibrid is a web-like sheet that does not encapsulate the zeolite.

The term "gas permeable paper" means a sheet or layer of media material that either permits passage of nitrogen gas or air through the media in a gas permeation experiment at a rate≥3 $M^3$/minute/$M^2$, measured under a 0.1 to 10 inches of water differential pressure, or that adsorbs nitrogen gas in an adsorption experiment with an average equilibration time of ≤10 seconds. Thus, gas permeability can be measured directly, via a measurement of actual air flow through the media, or indirectly, via measurement of the rate that an adsorbate gas can diffuse to at least 90% of all the available adsorption sites throughout the media.

The term "adsorbate equilibration time" means the time period, $t_E$, for an adsorbent material to stabilize its change in weight arising from either the adsorption or desorption of $N_2$ (or other suitable gas) in response to a pressure change from $P_1$ to $P_2$, ("$\Delta P$"), wherein $\Delta P$ is at least a 10% change in the $N_2$ pressure over the adsorbent material and $t_E$ is measured from $P_2$ to the time at which the adsorbent material has obtained 95% of the adsorbent material's total weight change arising from $\Delta P$.

The term "average adsorbate equilibration time" means the average of three $t_E$ values, $t_{E1}$, $t_{E2}$ and $t_{E3}$ obtained for three different $\Delta P$ intervals, $\Delta P_1$, $\Delta P_2$ and $\Delta P_3$, respectively, wherein $\Delta P_1$, $\Delta P_2$ and $\Delta P_3$ are in within a range from 10.13 kilopascals (0.1 Bar) to 1013 kilopasacals (10 Bar), and do not overlap with each other over each respective $\Delta P$ interval.

The term "rapid cycle equilibration rate" (RCE rate) means an average adsorbate equilibration time less than or equal to 10 seconds, whether the adsorbent material's average adsorbate equilibration time is determined over a range of positive $\Delta P$ values (i.e., pressure increase from $P_1$ to $P_2$) or negative $\Delta P$ values (i.e., pressure decrease from $P_1$ to $P_2$).

The adsorbent paper of the present invention may be used in pressure swing adsorption (PSA) and vacuum swing adsorption (VSA) or V-PSA. The adsorbates have an RCE rate≤10 seconds. Other gas separations include, but are not limited to, $N_2$ from air, $CO_2$ from air, $CO_2$ from natural gas, and $CO_2$ or CO from $H_2$.

Paper Media Overview:

Aspects of the invention are directed to zeolite-containing paper media prepared with p-aramid fibrids. After the paper media is made it can be formed into an array of different objects. One example is as a spirally wound element containing inter-leaving spacers to facilitate gas flow between adjacent layers of the paper media (e.g., see U.S. Pat. No. 6,176,897). A second example is a multi-layered media wheel or monolith with alternating layers of flat and corrugated adsorbent paper providing open-ended passages parallel to the axis of rotation permit gas flow therethrough (e.g., see U.S. Pat. No. 5,685,897 and U.S. Pat. No. 6,231,644). A third example is formation of the paper media into an irregular or regular honeycomb-type structure, which permits gas flow through the chambers forming the honeycomb structure (e.g., see U.S. Pat. No. 4,012,206). The adsorbent media can be formed into other forms and shapes apparent to those skilled in the art.

Likewise, the adsorbent media can be made using a variety of methods apparent to those skilled in the art. Paper making techniques are frequently used for making zeolite-containing paper. Accordingly, the process for making paper media, such as zeolite-containing paper media, will now be described for non-limiting, illustrative purposes only.

Generally, paper media is prepared from a natural or synthetic fiber material. This fiber material can be combined with the adsorbent and wet-laid into a continuous sheet or handsheet. This wet-laying is achieved by forming a slurry of the fiber, the adsorbent and typically one or more binder components in water. In some cases of the inventive process water having a controlled ionic content, such as for example, without limitation, a non-deionized water having a specific conductance in the range from 2.2 microSiemens·$cm^{-1}$ ($\mu S \cdot cm^{-1}$) to 150 $\mu S \cdot cm^{-1}$ ("NDISC water") is used. This slurry can then be transferred to a handsheet mold, laboratory paper machine, or to a head box of a continuous wire paper machine for discharging or laying onto a Fourdrinier or Twin-Wire paper machine, for example. The adsorbent comprises a zeolite alone or perhaps in combination with silica gels or alumina, depending on the intended application. In addition, silica gels or alumina could be added for certain PSA separations. Other additives may also be included to such as materials to enhance the paper media.

More specifically, a slurry is first formed in a mixing container—typically a mild steel, stainless steel tank or a polymer-lined vessel—using NDISC water, aramid fibers, at least a precursor zeolite powder (e.g., LiX powder), and the p-aramid fibrid material. Using NDISC water will keep the reduction in the Li content of the LiX in a finished paper media relative to the Li content in the precursor LiX—before paper media production process is begun—in a range from 0.01% to 15%. Although some Li cations can be displaced by a certain percentage of monovalent and divalent cations, respectively, NDISC water will preserve a sufficient Li content in the zeolite (e.g., LiX) of the finished paper media so that its sorption selectivity and capacity (e.g., for $N_2$ versus $O_2$) remains acceptable.

Slurry Make-Up Generally:

Generally, a slurry is made by dispersing a fiber, which can be either synthetic or natural, in NDISC water. A small amount of LiOH is then added to the slurry to give a concentration of $1\times10^{-2}$ M to prevent decationization, or unwanted replacement of Li cations in the zeolite with protons. A wet pulp of p-aramid fibrids and the adsorbent material, which includes at least a zeolite, is then added to the slurry containing the fiber. In subsequent stages, organic coagulants such as polydimethyldiallylammonium chloride and/or flocculants such as polyacrylamide-based polyelectrolytes and/or inorganic flocculants such as $SiO_2$ may be added to the slurry mix. These ingredients serve as retention aids, thereby increasing the solids yield of the paper-making process.

Para-Aramid Fibrids:

The para-aramid fibrids are generally obtained in the form of a wet pulp containing 90% water. This wet pulp allows the fibrids to be more easily dispersed in the water slurries described above and preserves the film-like properties of the fibrids. The film properties of the fibrids may be damaged if the fibrids are significantly dried during their preparation or storage prior to forming the final product sheets. For example, the fibrids may roll up and/or aggregate in ways that are difficult to re-disperse. It is therefore important to maintain the film-like character of the fibrids. See FIG. 1 for an example of a p-aramid fibrid as used in a zeolite containing paper of the present invention.

Fibers:

Regarding fiber materials used to make adsorbent media, particularly a paper media, any type of fibrous material can be used that can be fibrillated and thereafter formed by standard paper-making processes into adsorbent paper. Fibrillated fiber as used herein means fiber shafts which are split at their ends to form fibrils, i.e., fine fibers or filaments much freer than the fiber shafts. Examples of fibrillated fibers include natural fibers such as wood pulp or cellulosic fibers, and synthetic fibers and mixtures thereof.

Examples of fibrillated and non-fibrillated synthetic organic fibers include polymeric fibers selected from the group of high-density polyethylenes, high-density polypropylenes, aromatic polyamides (aramids), polystyrenes, aliphatic polyamides, polyvinyl chlorides, polyesters, nylons, rayons (cellulose acetate), acrylics, acrylonitrile homopolymers, copolymers with halogenated monomers, styrene copolymers, and mixtures of polymers (polypropylene with low-density polyethylene, and high-density polyethylene with polystyrene).

Fibrillated and non-fibrillated synthetic fibers often used in making paper media include aramid and acrylic fibers. One type of aramid fiber is formed from a long-chain synthetic aromatic polyamide having at least 85% of the amide (—CO—NH—) linkages directly attached to the two aromatic rings. One example of an aramid fiber available from E. I. du Pont de Nemours & Company (DuPont) is KEVLAR® 303. In forming fibrillated KEVLAR®, high shear is applied to KEVLAR® fiber shafts which split at their ends into fibrils to create a tree-like structure. In the production of paper media, the fibrils interlock to enhance the paper strength and provide increased area for capturing or securing adsorbent particles. KEVLAR® is stable in oxidizing atmospheres up to 450° C. Other high-temperature aramid fibers such as NOMEX®, TWARON® and TEIJINCONEX® are available from Du Pont and Teijin Twaron.

Acrylic fibers such as CFR® fibrillated acrylic fibers from Sterling Fibers may also be in combination with aramid fibers.

Non-fibrillated inorganic fibers, such as glass or metal fibers and rock wool, etc., may be used in combination with fibrillated organic fibers. The amount of fibrillated and non-fibrillated fibers can be adjusted to suit the particular need including the use of up to 100% fibrillated fibers.

If the fibers are not available in fibrillated form, fibers can be fibrillated by transferring a slurry of the fibers to a disc or other high shear refiner to split the ends of the chopped fibers or shafts to provide fibrils thereon. In addition, fibrillated shafts available from the manufacturer can be further refined to increase the degree of fibrillation on the shafts which results in a higher degree of interlocking and consequently stronger paper media.

Generally, the shafts or chopped fibers are provided in a length in the range of 1 to 30 mm, and typically in the range of 3 to 15 mm, prior to fibrillation. Further, generally the shafts or chopped fibers have a diameter in the range of 1 to 50 microns, and typically 5 to 25 microns, prior to fibrillation. In fibrillated form, the chopped fibers have fibrils extending therefrom generally having lengths in the range from 0.5 to 28 mm and diameters in the range from 0.5 to 40 microns and more typically lengths in the range from 1 to 10 mm. and diameters in the range from 1 to 10 microns.

Zeolites:

Molecular sieves include zeolite molecular sieves. Zeolites are crystalline aluminosilicate compositions that are microporous and have a three-dimensional oxide framework formed from corner-sharing $AlO_2$ and $SiO_2$ tetrahedra. Both naturally occurring and synthetic zeolites can be used in the media. However, at least a Li containing zeolite X, LiX, having a Si to Al ratio in the range from 1.0 to 1.5 is desirable where the adsorbent media will be used to selectively separate $N_2$ from a $N_2/O_2$ gas mixture. However, depending on the intended component separation, other zeolites or adsorbent materials including, without limitation, alumina, silica gel or activated carbon may be combined with the zeolite, whether LiX or another zeolite.

Non limiting examples of other zeolites are zeolite Y, A and beta. Faujasite-type Y zeolites include DDZ-70, Y-54, Y-74, Y-84, Y-85, steam calcined rare earth exchanged Y-54, low cerium rare earth exchanged Y-84, low cerium rare earth exchanged zeolite LZ-210.

Optional Ingredients:

Additives include effective amounts of retention aids, such as coagulants and/or flocculants (e.g. 0.05 to 1 wt % based on total solids). Organic coagulants such as low molecular weight polyelectrolytes can be used (e.g. poly-dimethyldiallylammonium chloride or poly-DADMAC). Organic flocculants such as polyacrylamide-based polyelectrolytes and/or inorganic flocculants such as $SiO_2$ (e.g. 1 to 5 wt % based on total solids.) may be added to the slurry mix. These coagulants and flocculants serve as retention aids, thereby increasing the solids yield of the paper-making process.

Additives such as binders suitable for maintaining the integrity of the paper media can be added to the slurry for purposes of improving paper media strength by bonding fiber shafts and fibrils together to form a matrix and for retaining the adsorbent on or within the fiber shafts and fibril matrix. Binders found suitable for use with acrylic fibers include acrylic latex, starch, polyvinyl alcohols/acetates, microcrystalline cellulose, for example, carboxymethyl cellulose.

Content of Paper Based on Total Solids:

The RCA paper is prepared from the particulate-free para-aramid fibrid, zeolite particles, and aramid fibers. Typically, the paper contains 0.5 to 10 weight percent particulate-free para-aramid fibrid based on total solids, preferably 0.5 to 5 weight percent; 60 to 85 weight percent zeolite particles, based on total solids, preferably 65 to 80 weight percent; and 5 to 39.5 weight percent aramid pulp based on total solids, preferably 15 to 34.5 percent. The ingredients are suitably combined with water to form a slurry having 0.5 to 20 weight percent solids. The fibrid content should avoid being so high that it produces a paper providing a substantial gas barrier—such as the gas barrier property of a typical gasket-type material, for example—instead of a gas permeable paper.

Slurry Solids Content, Wet-Laying, Slurry Drainage & Paper Forming:

The final slurry being used for wet laying can contain from 0.5 to 20 weight percent solids but preferably contains from 0.5 to 4 weight percent solids. Paper media can be formed by either making handsheets in a laboratory handsheet apparatus or using a Fourdrinier paper machine or other type of paper machine.

A handsheet mold consists of an open top vessel with square 12 by 12 inch wire screen at its bottom where the paper sheet can be formed. The vessel is hinged immediately above the screen so the paper can be peeled from the screen. Below the screen is a funnel which leads to a standpipe and valve. When the valve is opened, the standpipe, which is full of water, empties, pulling a vacuum on the pulp slurry above the screen. This causes the pulp mixture to deposit on the screen, forming the paper. The wet paper is normally pressed gently with blotter paper to remove additional moisture before it is pealed from the screen. It is then removed and dried on a hot metal surface, such as a photographic print drier, for example.

Alternatively, laboratory handsheets can be fabricated with a semiautomatic paper machine such as a Retention Tester available from Techpap™. Handsheets fabricated on a Retention Tester are circular and 7 inches in diameter.

The Fourdrinier paper machine applies the same principles as the handsheet apparatus, but makes paper continuously by providing a moving wire (screen belt) which passes over a vacuum section to remove most of the water from the slurry and the paper that's formed accordingly. Before the paper is peeled from the wire, it normally travels over a wet press section where a porous roller may be used to squeeze additional moisture from the paper. Because the wire continuously moves, it can cause fiber orientation which imparts higher tensile strength in the machine direction than in the cross direction. The paper then passes to a series of large diameter steam-heated metal rollers (called cans) which dry the paper. The paper can then optionally be calendared or pressed at high pressure between two or more steel rollers to reduce caliper and increase paper density. Paper leaving the calendar rolls or heater cans is then wound on a core.

The viscosity of the slurry mixture, frequently described as the furnish (i.e., batch mixture), is adjusted to provide acceptably fast drainage rate and a high retention on the screen (usually >80%). Batch additives such as binders and retention aids (e.g. flocculants and/or coagulants) are typically added at different parts of the process. Although 5 to 15% acrylic emulsion can be used as binder, other binders such as starch, polyvinyl alcohol/acetate (PVA), among others such as those noted above, can be used.

Also, in the case where the adsorbent in the furnish is a lithium exchanged zeolite (e.g., LiX), to help reduce the extent to which Li is displaced by more strongly selective monovalent cations, 5 to 50 times the total moles of monovalent cations present in the process water are added as LiOH to the water. Preferably, the Li is added as LiOH. However, other forms of Li salts may be used along with the LiOH depending on other process or formulation conditions, such as, without limitation, LiCl, LiBr, $Li_2SO_4$, $LiNO_3$ or Li-acetate, provided LiOH is added to the water in sufficient quantities to adjust the pH between 9 and 10 to preclude decationization of the zeolite.

The paper media is typically produced into relatively thin, porous layer. So, tensile strength is an important property of the paper media, particularly where the paper media will be formed into a corrugated shape. Generally, a minimum tensile strength of 3 to 4 pounds/inch (525 to 700 N/m) of width is desired and preferably greater than 7 pounds/inch (1225 N/m) is desired for improving the paper media's resistance to stress of most corrugation processes.

Generally, the adsorbent media has a substantially uniform thickness and is 0.1 mm to 1 mm (0.004 to 0.04 inches) thick. Thus, the media is one-half (½) to one-twentieth (1/20) the thickness of adsorbent beads or granules. As such, the media provides a shorter diffusion path, which allows for a relatively faster rate of mass transfer into and out of the media.

In addition, the density of the adsorbent media is substantially uniform. The density and uniformity of the adsorbent media, such as a paper media, for example, is dependent on, without limitation, the furnish composition, wet-laying conditions, and calendaring conditions. Preferably, the density of the adsorbent media is in a range of from 0.5 to 1.1 $g/cm^3$.

Adsorption Process with Adsorbent Media:

The adsorbent media of the present invention is advantageously used in an adsorption process, wherein a component of a gas mixture that is more strongly adsorbed than other components of the gas mixture is separated from the other components by contacting the gas mixture with the adsorbent media under conditions that effect adsorption of the strongly adsorbed component. Preferred adsorption processes include pressure swing adsorption (PSA), vacuum swing adsorption (VSA), and combinations thereof.

The temperature at which the adsorption step of the adsorption process is carried out depends upon a number of factors, such as the particular gases being separated, the particular adsorbent being used, and the pressure at which the adsorption is carried out. In general, the adsorption step of the process is carried out at a temperature of at least $-190°$ C., preferably at a temperature of at least $-20°$ C., and most preferably at a temperature of at least $0°$ C. The upper temperature limit at which the adsorption step of the process is carried out is generally $400°$ C., and the adsorption step is preferably carried out at temperatures not greater than $70°$ C., and most preferably carried out at temperatures not greater than $50°$ C.

The adsorption step of the process of the invention can be carried out at a pressure known to those skilled in the art of gas phase temperature swing adsorption and pressure swing adsorption processes. Typically the minimum absolute pressure at which the adsorption step is carried out is generally 0.7 bara (bar absolute), preferably 0.8 bara and most preferably 0.9 bara. The adsorption can be carried out at pressures as high as 70 bara or more, but is preferably carried out at absolute pressures, and preferably not greater than 50 bara.

When the adsorption process is PSA, the pressure during the regeneration step is reduced, usually to an absolute pressure in the range of 0.1 to 5 bara, and preferably to an absolute pressure in the range of 0.175 to 2 bara, and most preferably to an absolute pressure in the range of 0.2 to 1.1 bara.

As indicated above, the process of the invention can be used to separate any two gases, provided that one of the gases is more strongly adsorbed by the adsorbents of the invention than is the other gas under either conditions of equilibrium or non-equilibrium, i.e., in the kinetic regime of a process. The process is particularly suitable for separating nitrogen from oxygen, nitrogen and argon from oxygen, carbon dioxide from air, hydrogen from hydrocarbons, carbon oxides, nitrogen, and water, dinitrogen oxide from air and for the separation of hydrocarbons, for example, the separation of alkenes, such as ethylene, propylene, etc., from alkanes, such as ethane, propane, etc., and the separation of straight-chain hydrocarbons from branched-chain hydrocarbons, e.g., the separation of n-butane from i-butane.

The RCA paper is a gas permeable paper that has a rapid cycle equilibration rate effective for producing the product stream enriched in the first gas

EXAMPLES

The invention is described in further detail in connection with the following examples which illustrate or simulate various aspects involved in the practice of the invention. All changes that come within the spirit of the invention are intended to fall within the scope of the claimed invention. Accordingly, these examples are not presented to limit, but only to illustrate, without limitation, certain embodiments of the claimed invention.

Examples 1-11

Adsorbent Paper Media Production

Adsorbent paper media samples are made by the addition of 4.76 ml of 1.5M LiOH to 3 L of water prepared by mixing tap water (specific conductance 280 µS·cm$^{-1}$, 8 ppm Na$^+$, 1.3 ppm K$^+$, 13 ppm Mg$^{2+}$, 37 ppm Ca$^{2+}$) with deionized water from U.S. Filter Service Deionization, mixed bed type I (specific conductance 0.4 µS·cm$^{-1}$, 0.2 ppm Na$^+$, 0.1 ppm K$^+$, 0.01 ppm Mg$^{2+}$ and Ca$^{2+}$). The mixed, or NDIST, water is used to control the ionic content of the water used in the paper furnish.

A total of 4.8 g solids are added to the LiOH-water in the amounts shown in Table 1, according to the following procedure.

Aramid fibers (Twaron® Aramid from Teijin) and Twaron® Jet-Spun Fibrids, both from Teijin, and LiX zeolite powder (UOP molecular sieve; 1.0-1.05 Si/Al ratio) are added to 1 L of the 3 L the LiOH-water prepared above. The remaining 2 L of prepared water is put aside for later use in the formulation. The 1 L mixture containing the fibers, fibrids, and zeolite powder is placed in high shear blender and blended for 1 minute. The slurry is then transferred to a feed tank of a Techpap™ Retention Tester laboratory paper machine along with the additional 2 L of water that had been saved above. While the slurry is stirred (440 rpm), a colloidal silica (Ludox® SM-30 and AS-40 by Sigma-Aldrich) is added at 3% of the total solids weight. After an additional minute of stirring, a flocculant (Percol® 175 or 292 from Ciba Specialty Chemicals Corporation) is added dropwise until complete flocculation is reached, as evidenced by a substantial clearing of the furnish solution around snowflake-like flocs composed of fibers, fibrids and zeolite. The resultant furnish is homogenized for an additional minute, then run through the paper machine to form a sheet. The sheet is then dewatered in a roll press and placed in a sheet dryer for at 80-140° C. for 15 to 20 minutes.

TABLE 1

| Sample | Volume D.I. water; L | Volume Tap water; L | Total Solids, g | Aramid | Fibrids | LiX Zeolite | Flocculant | SiO$_2$ |
|---|---|---|---|---|---|---|---|---|
| | | | | Amounts in wt. %, based on total solids | | | | |
| 1 | 2.85 | 0.15 | 4.8 | 15.91 | 1.78 | 78.89 | 0.25 | 3.17 |
| 2 | 2.55 | 0.45 | 4.79 | 15.95 | 1.78 | 79.05 | 0.32 | 2.89 |
| 3 | 2.7 | 0.3 | 4.8 | 17.74 | 1.78 | 78.93 | 0.34 | 2.98 |
| 4 | 3 | | 4.84 | 18.04 | 1.78 | 78.8 | 0.25 | 2.9 |
| 5 | 3 | | 4.8 | 17.79 | 1.78 | 78.87 | 0.37 | 2.97 |
| 6 | 2.7 | 0.3 | 4.8 | 17.8 | 1.78 | 78.91 | 0.37 | 2.93 |
| 7 | 2.85 | 0.15 | 4.79 | 16.05 | 1.78 | 78.96 | 0.23 | 2.99 |
| 8 | 3 | | 4.79 | 16.05 | 1.78 | 78.97 | 0.26 | 2.94 |
| 9 | 2.7 | 0.3 | 4.8 | 15.96 | 1.9 | 78.86 | 0.35 | 2.93 |
| 10 | 2.4 | 0.6 | 4.8 | 15.95 | 1.98 | 78.82 | 0.28 | 2.96 |
| 11 | 2.7 | 0.3 | 4.79 | 15.94 | 1.78 | 79.08 | 0.26 | 2.95 |

Examples 12-18

Several samples were prepared and the average equilibrium values were determined for each sample. A gas adsorption system containing an electromagnetic balance with means to evacuate the volume of the device and means to admit and remove gases under controlled pressures was used for these nitrogen adsorption experiments. The sample is first placed in the weighing pan of the electromagnetic balance and heated under vacuum to activate the contained adsorbent particles. An activated mass is recorded. Nitrogen is admitted, increasing the pressure from an initial pressure, $P_1$ to a final pressure $P_2$. The time that the system reaches $P_2$ is taken as the initial time $T_1$, and the time that the mass of the sample reaches 95% of the adsorbent material's total weight change (wt. % change) is taken to be $T_2$. The difference between $T_1$ and $T_2$ is taken to be the equilibration time, $T_{E1}$. In second experiment the final pressure $P_2$ from experiment 1 now becomes the new $P_1$, and the pressure is changed to a new $P_2$ with associated new $T_1$ and $T_z$, wt. % change, and a second equilibration time $T_{E2}$. The experiment is repeated as many times as desired but usually at least once more giving an additional equilibration time, $T_{E3}$. The average of at least three equilibration times $T_{E1}$ through $T_{E3}$ (or $T_{EN}$) gives the average equilibration time for the sample, $T_{E\text{-}average}$. The sample numbers given in TABLE 2 and 3 correspond to the numbers of the corresponding samples in TABLE 1. TABLE 2 contains the raw adsorption data collected as described above. TABLE 3 contains the calculations of quantities Wt. % change, $\Delta P_N$, $T_{EN}$, and $T_{E\text{-}average}$, for the samples.

TABLE 2

| Sample # | Experiment 1 | | | Experiment 2 | | | Experiment 3 | | |
|---|---|---|---|---|---|---|---|---|---|
| | Wt. % at $T_1$; Wt. % at $T_2$ | $T_1$, $T_2$; sec | $P_2$, $P_1$; torr | Wt. % at $T_1$; Wt. % at $T_2$ | $T_1$, $T_2$; sec | $P_2$, $P_1$; torr | Wt. % at $T_1$; Wt. % at $T_2$ | $T_1$, $T_2$; sec | $P_2$, $P_1$; torr |
| 1 | 3.583 | 434.2 | 1003.69 | 5.317 | 465.7 | 2567.59 | 6.143 | 485.7 | 3955.46 |
|   | 2.956 | 429.2 | 397.37 | 4.259 | 462.2 | 1445.02 | 5.336 | 480.7 | 2556.52 |
| 2 | 1.482 | 388.8 | 249 | 4.27 | 462.3 | 1446.9 | 5.38 | 478.8 | 2567.08 |
|   | 0.664 | 383.3 | 99.64 | 3.6 | 456.8 | 1003.29 | 4.278 | 473.3 | 1445.46 |
| 3 | 2.55 | 418.8 | 545.98 | 4.257 | 478.8 | 1447.48 | 6.197 | 515.3 | 3957.36 |
|   | 1.48 | 412.3 | 249.28 | 3.59 | 473.8 | 1002.79 | 5.362 | 510.3 | 2567.25 |
| 4 | 1.557 | 399.2 | 248.86 | 3.618 | 454.71 | 1004.15 | 4.271 | 485.4 | 1445.55 |
|   | 0.769 | 393.7 | 99.76 | 2.995 | 449.2 | 445.5 | 3.621 | 479.9 | 1001.91 |
| 6 | 0.264 | 277.8 | 548.84 | 0.907 | 309.9 | 1452.12 | 2.447 | 343.8 | 3959.07 |
|   | 0.04 | 274.8 | 249.45 | 0.589 | 306.8 | 994.23 | 1.635 | 338.3 | 2567.47 |
| 7 | 1.402 | 379.4 | 248.73 | 3.324 | 448.4 | 990.99 | 5.039 | 499.4 | 2568.14 |
|   | 0.639 | 374.4 | 99.58 | 2.769 | 443.9 | 697.53 | 3.983 | 492.4 | 1445.4 |
| 10 | 0.624 | 380.1 | 99.76 | 2.33 | 411.6 | 599.32 | 4.868 | 477.1 | 2566.66 |
|   | 0.292 | 376.1 | 49.85 | 1.376 | 405.6 | 248.95 | 3.846 | 472.1 | 1445.17 |

TABLE 3

| Sample # | Experiment 1 | | | Experiment 2 | | | Experiment 3 | | | $T_{E\text{-}average}$; sec |
|---|---|---|---|---|---|---|---|---|---|---|
| | Wt. % Change | $T_{E1}$; sec | $\Delta P_1$; torr | Wt. % Change | $T_{E2}$; sec | $\Delta P_2$; torr | Wt. % Change | $T_{E3}$; sec | $\Delta P_3$; torr | |
| 1 | 0.627 | 5 | 606.32 | 1.058 | 3.5 | 1122.57 | 0.807 | 5 | 1398.94 | 4.5 |
| 2 | 0.818 | 5.5 | 149.36 | 0.67 | 5.5 | 443.61 | 1.102 | 5.5 | 1121.62 | 5.5 |
| 3 | 1.07 | 6.5 | 296.7 | 0.667 | 5 | 444.69 | 0.835 | 5 | 1390.11 | 5.5 |
| 4 | 0.788 | 5.5 | 149.1 | 0.623 | 5.51 | 558.65 | 0.65 | 5.5 | 443.64 | 5.5 |
| 6 | 0.224 | 3 | 299.39 | 0.318 | 3.1 | 457.89 | 0.812 | 5.5 | 1391.6 | 3.9 |
| 7 | 0.763 | 5 | 149.15 | 0.555 | 4.5 | 293.46 | 1.056 | 7 | 1122.74 | 5.5 |
| 10 | 0.332 | 4 | 49.91 | 0.954 | 6 | 350.37 | 1.022 | 5 | 1121.49 | 5.0 |

The seven media samples that were subjected to nitrogen adsorption measurements all displayed $T_{E\text{-}average}$ values smaller than 10 seconds, indicating that they are suitable for rapid cycle adsorption processes While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A rapid cycle, gas permeable, adsorbent-containing ("RCA") paper suitable for separating at least a portion of a first gas from a second gas in a gas mixture to produce a product stream enriched in the first gas, the RCA paper comprising
    a. 0.5 to 10 weight percent particulate-free para-aramid fibrid based on total solids;
    b. 60 to 85 weight percent zeolite particles, based on total solids; and
    c. 5 to 39.5 weight percent aramid pulp based on total solids;
wherein the RCA paper is a gas permeable paper that has a rapid cycle equilibration rate effective for producing the product stream enriched in the first gas.

2. A process for making a rapid cycle, gas permeable, adsorbent-containing ("RCA") paper suitable for separating at least a portion of a first gas from a second gas in a gas mixture to produce a product stream enriched in the first gas, comprising:
    i) forming a slurry of particulate-free para-aramid fibrid, zeolite particles, and aramid pulp;
    ii) drying the slurry to form a paper comprising
        a. 0.5 to 10 weight percent particulate-free para-aramid fibrid based on total solids;
        b. 60 to 85 weight percent zeolite particles, based on total solids; and
        c. 5 to 39.5 weight percent aramid pulp based on total solids;
    wherein the RCA paper is a gas permeable paper that has a rapid cycle equilibration rate effective for producing the product stream enriched in the first gas.

3. A rapid cycle process for separating at least a portion of a first gas from a second gas in a gas mixture to produce a product stream enriched in the first gas, said process comprising:
    supplying a rapid cycle apparatus with a paper comprising:
        a. 0.5 to 10 weight percent particulate-free para-aramid fibrid based on total solids;
        b. 60 to 85 weight percent zeolite particles, based on total solids; and
        c. 5 to 39.5 weight percent aramid pulp based on total solids;
    wherein the RCA paper is a gas permeable paper that has a rapid cycle equilibration rate effective for producing the product stream enriched in the first gas;
    feeding the gas mixture into the rapid cycle adsorption apparatus during a feed period not exceeding 20 seconds; and
    recovering said product stream enriched in the first gas.

4. The RCA paper of claim 1, wherein the paper comprises 0.5 to 5 weight percent particulate-free para-aramid fibrid based on total solids, 65 to 80 weight percent zeolite particles, based on total solids, and 15 to 34.5 weight percent aramid pulp based on total solids.

5. The process of claim 2 or claim 3, wherein the paper comprises 0.5 to 5 weight percent particulate-free para-aramid fibrid based on total solids, 65 to 80 weight percent zeolite particles, based on total solids, and 15 to 34.5 weight percent aramid pulp based on total solids.

6. The RCA paper of claim 4 wherein the paper has a substantially uniform thickness of 0.1 mm to 1 mm.

7. The process of claim 5 wherein the paper has a substantially uniform thickness of 0.1 mm to 1 mm.

8. The RCA paper of claim 1, wherein the paper further comprises an effective amount of a flocculant selected from the group consisting of cationic polyacrylamide and silica.

9. The process of claim 2 or claim 3, wherein the paper further comprises an effective amount of a flocculant selected from the group consisting of cationic polyacrylamide and silica.

10. The RCA paper or processes of claim 8 wherein the paper comprises 0.05 to 5 weight percent of the flocculant.

11. The RCA paper or processes of claim 9 or claim 10 wherein the paper comprises 0.05 to 5 weight percent of the flocculant.

12. The process of claim 2 wherein in step i), a slurry is formed having a solids content of 0.5 to 20 weight percent solids.

13. The rapid cycle process of claim 3 wherein the first gas is nitrogen, the second gas is oxygen and the zeolites have a rapid cycle equilibrium (RCE) rate of 10 seconds; or the first gas is $CO_2$, the second gas is methane and the zeolites have a rapid cycle equilibrium (RCE) rate of 10 seconds.

14. The rapid cycle process of claim 3 wherein the process is pressure swing adsorption (PSA) or is vacuum swing adsorption (VSA).

* * * * *